US011090990B2

(12) United States Patent
Ling

(10) Patent No.: US 11,090,990 B2
(45) Date of Patent: Aug. 17, 2021

(54) TRAILER POSITION, HEADING ANGLE, AND LEVEL MEASUREMENT WITH SMART DEVICE

(71) Applicant: Ford Global Technologies, LLC, Dearborn, MI (US)

(72) Inventor: Yu Ling, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 361 days.

(21) Appl. No.: 16/133,115

(22) Filed: Sep. 17, 2018

(65) Prior Publication Data
US 2020/0086702 A1  Mar. 19, 2020

(51) Int. Cl.
| B60D 1/36 | (2006.01) |
| B60R 1/00 | (2006.01) |
| B60R 11/04 | (2006.01) |
| B62D 15/02 | (2006.01) |
| B62D 5/04 | (2006.01) |
| B60D 1/06 | (2006.01) |

(52) U.S. Cl.
CPC .............. *B60D 1/36* (2013.01); *B60R 1/003* (2013.01); *B60R 11/04* (2013.01); *B62D 15/025* (2013.01); *B60D 1/06* (2013.01); *B60R 2300/808* (2013.01); *B62D 5/0463* (2013.01)

(58) Field of Classification Search
CPC .......... B60D 1/36; B60D 1/465; B60R 1/003; B60R 11/04; B60R 2300/808; B60R 2300/8086; B62D 15/025
See application file for complete search history.

(56) References Cited

U.S. PATENT DOCUMENTS

| 7,777,615 | B2 * | 8/2010 | Okuda | B60D 1/36 340/431 |
| 8,038,166 | B1 | 10/2011 | Piesinger | |
| 8,138,899 | B2 * | 3/2012 | Ghneim | B60D 1/36 340/435 |
| 8,191,915 | B2 | 6/2012 | Freese, V et al. | |
| 8,831,831 | B2 | 9/2014 | Headley | |
| 8,888,120 | B2 * | 11/2014 | Trevino | B60D 1/36 280/477 |
| 8,888,121 | B2 * | 11/2014 | Trevino | B60D 1/62 280/477 |
| 8,930,140 | B2 * | 1/2015 | Trombley | B62D 13/06 701/523 |
| 9,102,272 | B2 * | 8/2015 | Trombley | B62D 13/06 |
| 9,233,710 | B2 * | 1/2016 | Lavoie | B60R 1/00 |
| 9,283,892 | B2 * | 3/2016 | Trombley | B62D 13/06 |
| 9,290,203 | B2 * | 3/2016 | Lavoie | B62D 15/027 |
| 9,335,162 | B2 * | 5/2016 | Kyrtsos | B60W 30/00 |
| 9,352,777 | B2 | 5/2016 | Lavoie et al. | |
| 9,374,562 | B2 * | 6/2016 | Trombley | B60Q 9/005 |
| 9,434,381 | B2 | 9/2016 | Windeler | |

(Continued)

*Primary Examiner* — Kevin Hurley
*Assistant Examiner* — Michael R Stabley
(74) *Attorney, Agent, or Firm* — Raymond Coppiellie; Price Heneveld LLP

(57) ABSTRACT

A vehicle hitch assistance system includes a controller acquiring data from an external portable electronic device including position and orientation data of a trailer, including a coupler thereof, and deriving a vehicle path to align a hitch ball of the vehicle with the coupler using the position and orientation data of at least one of the trailer and the coupler.

20 Claims, 12 Drawing Sheets

(56) References Cited

U.S. PATENT DOCUMENTS

| | | | |
|---|---|---|---|
| 9,914,333 B2 | 3/2018 | Shank et al. | |
| 10,266,023 B2* | 4/2019 | Mattern | G05D 1/0044 |
| 2005/0074143 A1 | 4/2005 | Kawai | |
| 2012/0283909 A1* | 11/2012 | Dix | B60D 1/36 |
| | | | 701/41 |
| 2013/0321634 A1* | 12/2013 | Okano | B60D 1/62 |
| | | | 348/148 |
| 2014/0012465 A1* | 1/2014 | Shank | B62D 15/0285 |
| | | | 701/36 |
| 2014/0125795 A1* | 5/2014 | Yerke | B60R 1/00 |
| | | | 348/118 |
| 2015/0115571 A1* | 4/2015 | Zhang | H04N 7/183 |
| | | | 280/477 |
| 2016/0023601 A1* | 1/2016 | Windeler | B62D 15/0275 |
| | | | 348/118 |
| 2016/0052548 A1* | 2/2016 | Singh | B60D 1/36 |
| | | | 701/37 |
| 2017/0282658 A1* | 10/2017 | Shepard | B62D 15/028 |
| 2018/0029429 A1* | 2/2018 | Janardhana | B62D 15/025 |
| 2018/0361929 A1* | 12/2018 | Zhang | H04N 7/181 |
| 2019/0071123 A1* | 3/2019 | Zhang | B60D 1/62 |
| 2019/0283513 A1* | 9/2019 | Shepard | B60D 1/62 |

* cited by examiner

TRAILER POSITION, HEADING ANGLE, AND LEVEL MEASUREMENT WITH SMART DEVICE

FIELD OF THE INVENTION

The present invention generally relates to a vehicle hitch assistance system. In particular, the system acquires data from an external portable electronic device including position and orientation data of a trailer for use in deriving a vehicle path to align a hitch ball of the vehicle with a coupler of the trailer.

BACKGROUND OF THE INVENTION

Hitching a trailer to a vehicle can be a difficult and time-consuming experience. In particular, aligning a vehicle hitch ball with the desired trailer hitch can, depending on the initial location of the trailer relative to the vehicle, require repeated forward and reverse driving coordinated with multiple steering maneuvers to appropriately position the vehicle. Further, through a significant portion of the driving needed for appropriate hitch ball alignment, the trailer hitch cannot be seen, and the hitch ball can, under ordinary circumstance, never actually be seen by the driver. This lack of sight lines requires inference of the positioning of the hitch ball and hitch based on experience with a particular vehicle and trailer, and can still require multiple instances of stopping and stepping out of the vehicle to confirm alignment or to note an appropriate correction for a subsequent set of maneuvers. Even further, the closeness of the hitch ball to the rear bumper of the vehicle means that any overshoot can cause a collision of the vehicle with the trailer. Accordingly, further advancements may be desired.

SUMMARY OF THE INVENTION

According to one aspect of the present invention, a vehicle hitch assistance system includes a controller acquiring data from an external portable electronic device including position and orientation data of a trailer, including a coupler thereof, and deriving a vehicle path to align a hitch ball of the vehicle with the coupler using the position and orientation data of at least one of the trailer and the coupler.

Embodiments of the first aspect of the invention can include any one or a combination of the following features:
the orientation data includes a directional heading of the trailer, and the path is derived to align a vehicle longitudinal axis with the directional heading of trailer within a predetermined angular range about the hitch ball;
the position data includes a location of the coupler on a driving plane on which the vehicle is positioned;
the position data includes a height of the coupler, deriving a vehicle path to align a hitch ball of the vehicle with the coupler includes compensating for a determined change in the position of the coupler in a driving direction related to a difference between a vertical position of the coupler in the position data and a height of the hitch ball, and the controller determines a delta in the position of the coupler in a vertical direction to align with the hitch ball of the vehicle;
the driving direction is on a plane generally normal to the vertical direction;
the controller compensates for the change in the position of the coupler in the driving direction based on the position data related to the vertical position of the coupler by relating the change in position of the coupler in the vertical direction to the change in a position of the coupler in the driving direction as a matter of rotation of the coupler about an axis;
the axis is vertically aligned with a single axle of the trailer;
relating the change in the position of the coupler in the vertical direction to the change in the position of the coupler in the driving direction as a matter of rotation of the coupler about the axis is based on stored information including a distance between the coupler and the axis;
the system further includes a smartphone wirelessly connected with the controller, wherein the smartphone is the external device and includes at least one internal component useable to obtain the orientation and position data;
the system further includes a human-machine interface in communication with the controller, the controller causing the human-machine interface to display at least one prompt directing a user to operate the external portable electronic device for the controller to acquire the position and orientation data;
the system further includes one or more internal detection devices, wherein the controller first attempts to acquire data from the one or more internal detection devices including the position and orientation data of the trailer and, only if the controller is unable to acquire the data from the one or more internal detection devices, causes the human-machine interface to display the at least one prompt and acquires the data from the external portable electronic device;
the position and orientation data is relative to the vehicle;
the position and orientation data is absolute, and deriving the vehicle path to align the hitch ball of the vehicle with the coupler includes comparing the absolute position and orientation data of the trailer with known position and orientation data of the vehicle;
the position and orientation data is obtained with the external portable electronic device being positioned on a tongue of the trailer adjacent the coupler; and
the position and orientation data is storable in memory accessible by the controller, and the memory is configured to store position and orientation data entries for multiple trailers and associated couplers for selective access by the controller.

According to another aspect of the present invention, a vehicle includes a hitch ball mounted on an exterior of the vehicle and a controller. The controller acquires data from an external portable electronic device including position and orientation data of a trailer, including a coupler thereof and derives a vehicle path to align the hitch ball of the vehicle with the coupler using the position and orientation data of at least one of the trailer and the coupler.

According to another aspect of the present invention, a method for assisting a vehicle in hitching with a trailer includes acquiring data from an external portable electronic device including position and orientation data of the trailer, including of a coupler thereof. The method further includes deriving a vehicle path to align the hitch ball of the vehicle with the coupler using the position and orientation data of at least one of the trailer and the coupler.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
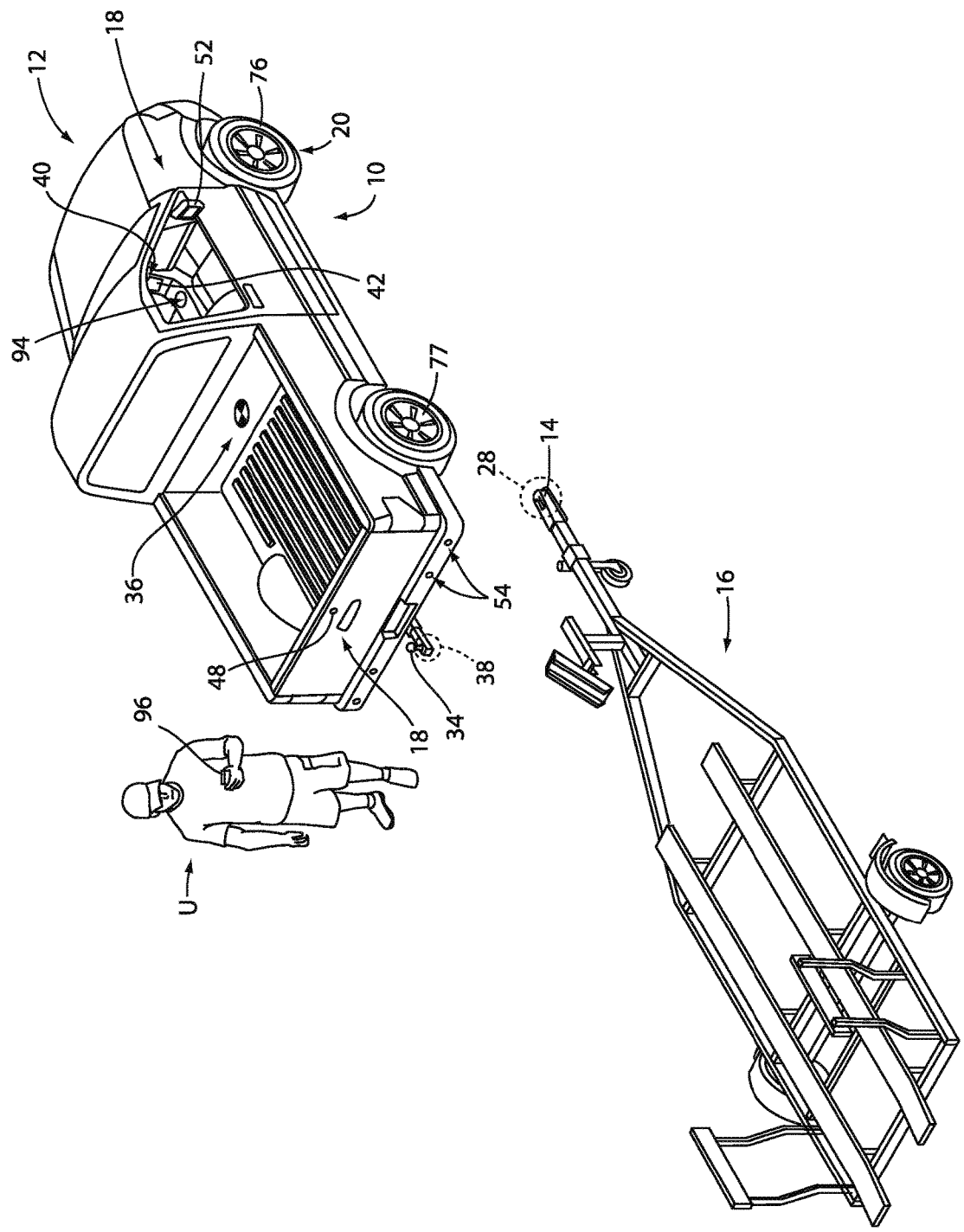
FIG. 1 is a perspective view of a vehicle in an unhitched position relative to a trailer.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring generally to FIGS. 1-15, reference numeral 10 designates a hitch assistance system (also referred to as a "hitch assist" system) for a vehicle 12. In particular, hitch assistance system 10 includes a controller 26 acquiring data from an external portable electronic device 96 including position and orientation data of a trailer 16, including a coupler 14 thereof, and deriving a vehicle path 32 to align a hitch ball 34 of the vehicle 12 with the coupler 14 using the position and orientation data of at least one of the trailer 16 and the coupler 14.

Figure 2:
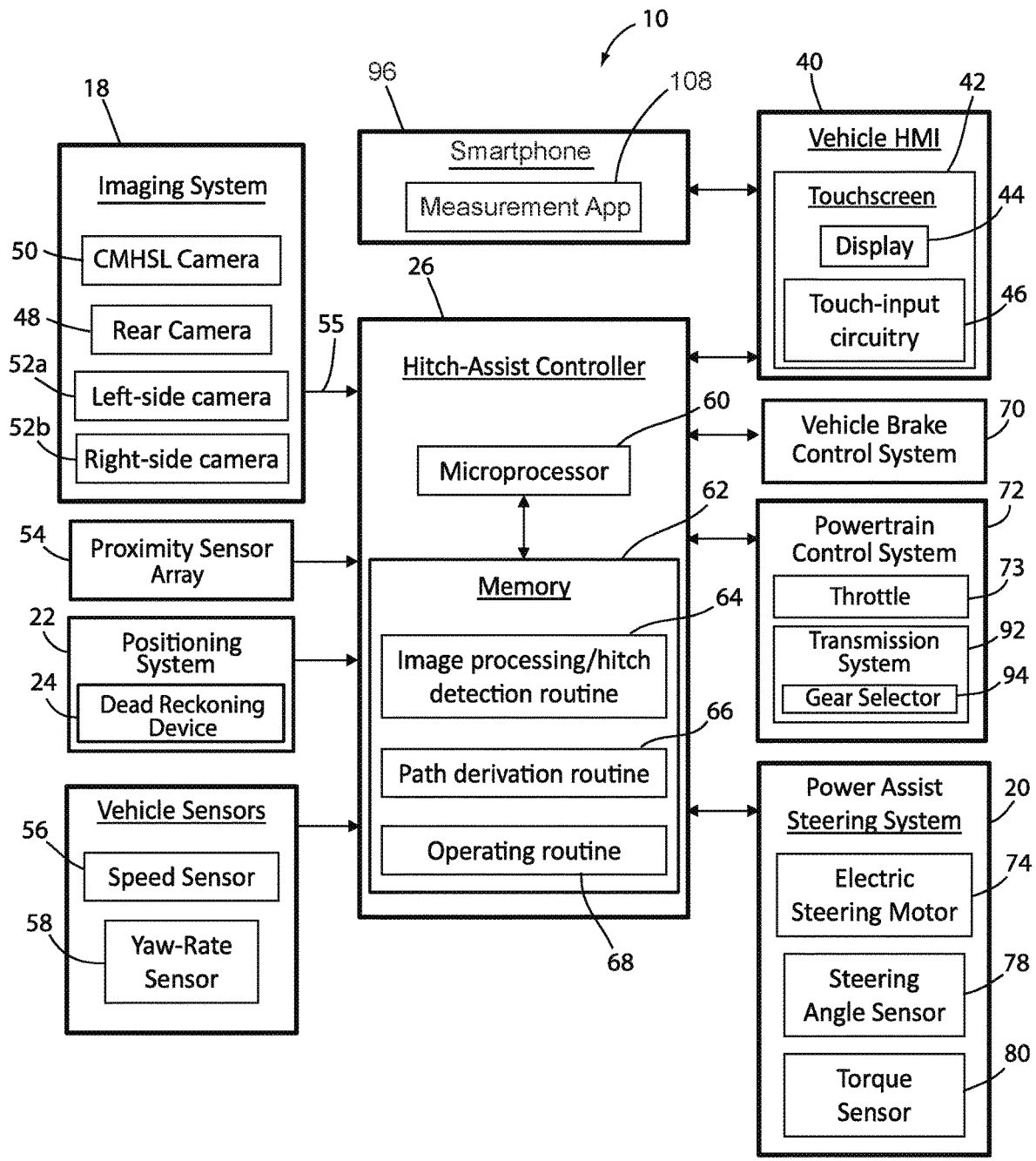
FIG. 2 is a diagram of a system according to an aspect of the disclosure for assisting in aligning the vehicle with a trailer in a position for hitching the trailer to the vehicle.

With respect to the general operation of the hitch assist system 10, as illustrated in the system diagram of FIG. 2, system 10 includes various sensors and devices that obtain or otherwise provide vehicle status-related information. This information includes positioning information from a positioning system 22, which may include a dead reckoning device 24 or, in addition or as an alternative, a global positioning system (GPS), to determine a coordinate location of the vehicle 12 based on the one or more locations of the devices within the positioning system 22. In particular, the dead reckoning device 24 can establish and track the coordinate location of the vehicle 12 within a localized coordinate system 82 based at least on vehicle speed and steering angle S. Other vehicle information received by hitch assist system 10 may include a speed of the vehicle 12 from a speed sensor 56 and a yaw rate of the vehicle 12 from a yaw rate sensor 58. It is contemplated that in additional embodiments, a proximity sensor 54 or an array thereof, and other vehicle sensors and devices may provide sensor signals or other information, such as sequential images of a trailer 16, including the detected coupler 14, that the controller 26 of the hitch assist system 10 may process with various routines to determine the height H and position (e.g., based on the distance $D_h$ and angle $\alpha_h$) of coupler 14.

As further shown in FIG. 2, one embodiment of the hitch assist system 10 is in communication with the steering system 20 of vehicle 12, which may be a power assist steering system 20 including an electric steering motor 74 to operate the steered wheels 76 (FIG. 1) of the vehicle 12 for moving the vehicle 12 in such a manner that the vehicle yaw changes with the vehicle velocity and the steering angle S. In the illustrated embodiment, the power assist steering system 20 is an electric power-assisted steering ("EPAS") system including electric steering motor 74 for turning the steered wheels 76 to a steering angle δ based on a steering command, whereby the steering angle δ may be sensed by a steering angle sensor 78 of the power assist steering system 20. The steering command 69 may be provided by the hitch assist system 10 for autonomously steering during a trailer hitch alignment maneuver and may alternatively be provided manually via a rotational position (e.g., steering wheel angle) of a steering wheel of vehicle 12. However, in the illustrated embodiment, the steering wheel of the vehicle 12 is mechanically coupled with the steered wheels 76 of the vehicle 12, such that the steering wheel moves in concert with steered wheels 76, preventing manual intervention with the steering wheel during autonomous steering. More specifically, a torque sensor 80 is provided on the power assist steering system 20 that senses torque on the steering wheel that is not expected from autonomous control of the steering wheel and therefore indicative of manual intervention, whereby the hitch assist system 10 may alert the driver to discontinue manual intervention with the steering wheel and/or discontinue autonomous steering. In alternative embodiments, some vehicles have a power assist steering system 20 that allows a steering wheel to be partially decoupled from movement of the steered wheels 76 of such a vehicle.

Figure 3:
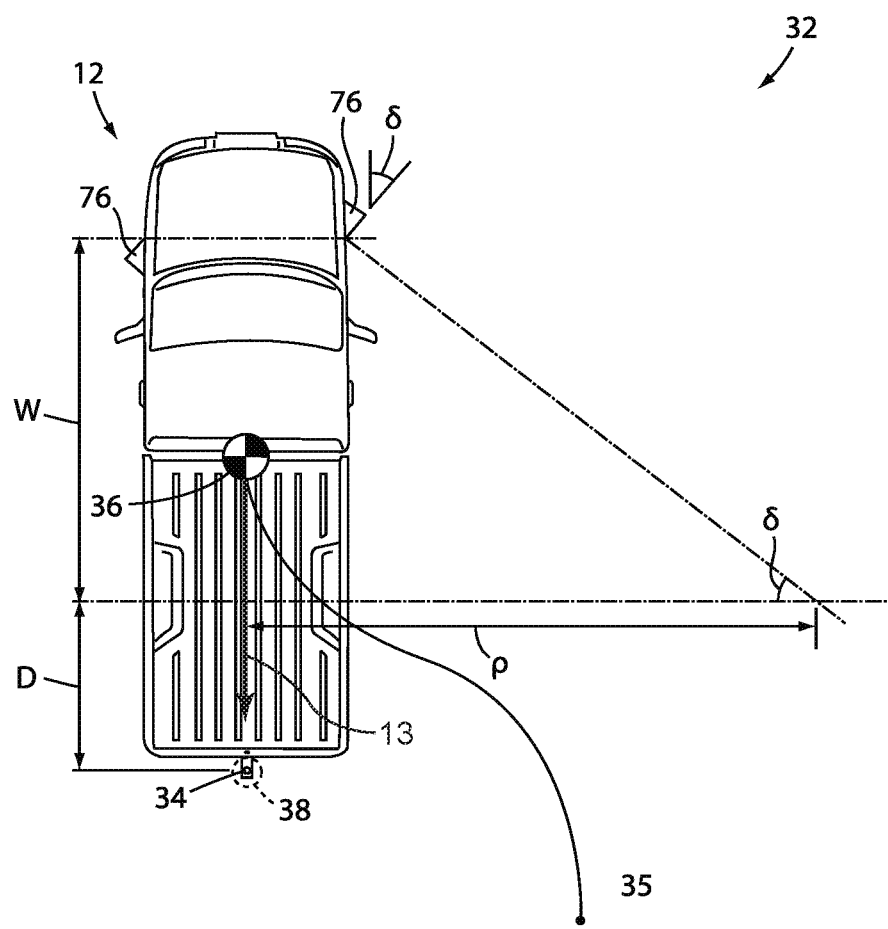
FIG. 3 is an overhead schematic view of a vehicle during a step of the alignment sequence with the trailer.
Figure 3:
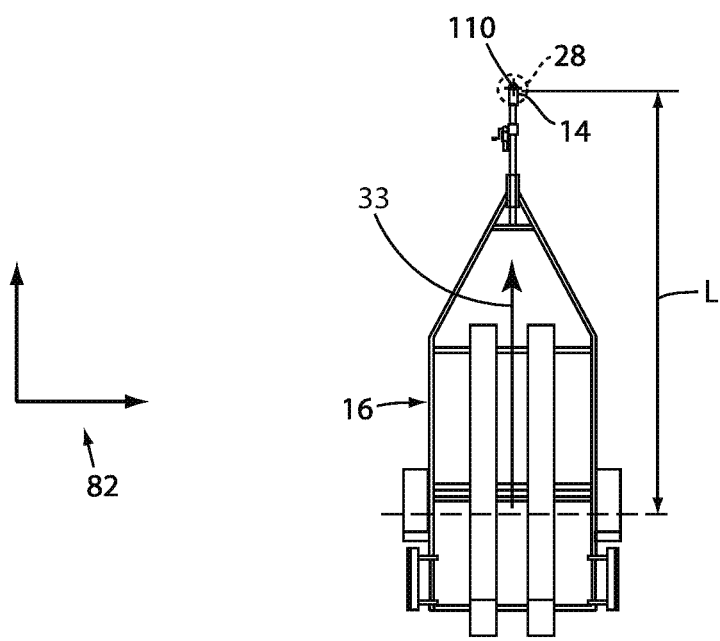

With continued reference to FIG. 2, the power assist steering system 20 provides the controller 26 of the hitch assist system 10 with information relating to a rotational position of steered wheels 76 of the vehicle 12, including a steering angle δ. The controller 26 in the illustrated embodiment processes the current steering angle, in addition to other vehicle 12 conditions to guide the vehicle 12 along the desired path 32 (FIG. 3). It is conceivable that the hitch assist system 10, in additional embodiments, may be an integrated component of the power assist steering system 20. For example, the power assist steering system 20 may include a hitch assist algorithm for generating vehicle steering information and commands as a function of all or a portion of information received from the imaging system 18, the power assist steering system 20, a vehicle brake control system 70, a powertrain control system 72, and other vehicle sensors and devices, as well as a human-machine interface 40, as discussed further below.

As also illustrated in FIG. 2, the vehicle brake control system 70 may also communicate with the controller 26 to provide the hitch assist system 10 with braking information, such as vehicle wheel speed, and to receive braking commands from the controller 26. For instance, vehicle speed information can be determined from individual wheel speeds as monitored by the brake control system 70. Vehicle speed may also be determined from the powertrain control system 72, the speed sensor 56, and the positioning system 22, among other conceivable means. In some embodiments, individual wheel speeds can also be used to determine a vehicle yaw rate $\dot{\gamma}$, which can be provided to the hitch assist system 10 in the alternative or in addition to the vehicle yaw rate sensor 58. The hitch assist system 10 can, further, provide vehicle braking information to the brake control system 70 for allowing the hitch assist system 10 to control braking of the vehicle 12 during backing of the trailer 16. For example, the hitch assist system 10, in some embodiments, may regulate speed of the vehicle 12 during alignment of the vehicle 12 with the coupler 14 of trailer 16, which can reduce the potential for a collision with trailer 16, and can bring vehicle 12 to a complete stop at a determined endpoint 35 of path 32. It is disclosed herein that the hitch assist system 10 can additionally or alternatively issue an alert signal corresponding to a notification of an actual, impending, and/or anticipated collision with a portion of trailer 16. The powertrain control system 72, as shown in the embodiment illustrated in FIG. 2, may also interact with the hitch assist system 10 for regulating speed and acceleration of the vehicle 12 during partial or autonomous alignment with trailer 16. As mentioned above, regulation of the speed of the vehicle 12 may be advantageous to prevent collision with trailer 16.

Additionally, the hitch assist system 10 may communicate with human-machine interface ("HMI") 40 for the vehicle 12. The HMI 40 may include a vehicle display 44, such as a center-stack mounted navigation or entertainment display (FIG. 1). HMI 40 further includes an input device, which can be implemented by configuring display 44 as a portion of a touchscreen 42 with circuitry 46 to receive an input corresponding with a location over display 44. Other forms of input, including one or more joysticks, digital input pads, or the like can be used in place or in addition to touchscreen 42. Further, the hitch assist system 10 may communicate via wireless communication with another embodiment of the HMI 40, such as with one or more handheld or portable devices 96 (FIG. 1), including one or more smartphones. The portable device 96 may also include the display 44 for displaying one or more images and other information to a user. For instance, the portable device 96 may display one or more images of the trailer 16 on the display 44 and may be further able to receive remote user inputs via touchscreen circuitry 46. In addition, the portable device 96 may provide feedback information, such as visual, audible, and tactile alerts.

Still referring to the embodiment shown in FIG. 2, the controller 26 is configured with a microprocessor 60 to process logic and routines stored in memory 62 that receive information from the above-described sensors and vehicle systems, including the imaging system 18, the power assist steering system 20, the vehicle brake control system 70, the powertrain control system 72, and other vehicle sensors and devices. The controller 26 may generate vehicle steering information and commands as a function of all or a portion of the information received. Thereafter, the vehicle steering information and commands may be provided to the power assist steering system 20 for affecting steering of the vehicle 12 to achieve a commanded path 32 (FIG. 3) of travel for alignment with the coupler 14 of trailer 16. The controller 26 may include the microprocessor 60 and/or other analog and/or digital circuitry for processing one or more routines. Also, the controller 26 may include the memory 62 for storing one or more routines, including an image processing 64 routine and/or hitch detection routine, a path derivation routine 66, and an operating routine 68. It should be appreciated that the controller 26 may be a stand-alone dedicated controller or may be a shared controller integrated with other control functions, such as integrated with a vehicle sensor system, the power assist steering system 20, and other conceivable onboard or off-board vehicle control systems. It should further be appreciated that the image processing routine 64 may be carried out by a dedicated processor, for example, within a stand-alone imaging system for vehicle 12 that can output the results of its image processing to other components and systems of vehicle 12, including microprocessor 60. Further, any system, computer, processor, or the like that completes image processing functionality, such as that described herein, may be referred to herein as an "image processor" regardless of other functionality it may also implement (including simultaneously with executing image processing routine 64).

System 10 can also incorporate an imaging system 18 that includes one or more exterior cameras, which in the illustrated examples include rear camera 48, center high-mount stop light (CMHSL) camera 50, and side-view cameras 52a and 52b, although other arrangements including additional or alternative cameras are possible. In one example, imaging system 18 can include rear camera 48 alone or can be configured such that system 10 utilizes only rear camera 48 in a vehicle with multiple exterior cameras. In another example, the various cameras 48, 50, 52a, 52b included in imaging system 18 can be positioned to generally overlap in their respective fields of view, which in the depicted arrangement include fields of view 49, 51, 53a, and 53b to correspond with rear camera 48, center high-mount stop light (CMHSL) camera 50, and side-view cameras 52a and 52b, respectively. In this manner, image data 55 from two or more of the cameras can be combined in image processing routine 64, or in another dedicated image processor within imaging system 18, into a single image. In an extension of such an example, the image data 55 can be used to derive stereoscopic image data that can be used to reconstruct a three-dimensional scene of the area or areas within overlapped areas of the various fields of view 49, 51, 53a, 53b, including any objects (obstacles or coupler 14, for example) therein. In an embodiment, the use of two images including the same object can be used to determine a location of the object relative to the two image sources, given a known spatial relationship between the image sources. In this respect, the image processing routine 64 can use known programming and/or functionality to identify an object within image data 55 from the various cameras 48, 50, 52a, and 52b within imaging system 18. In either example, the image processing routine 64 can include information related to the positioning of any cameras 48, 50, 52a, and 52b present on vehicle 12 or utilized by system 10, including relative to the center 36 (FIG. 1) of vehicle 12, for example such that the positions of cameras 48, 50, 52a, and 52b relative to center 36 and/or to each other can be used for object positioning calculations and to result in object position data relative to the center 36 of vehicle 12, for example, or other features of vehicle 12, such as hitch ball 34 (FIG. 1), with known positions relative to center 36.

As discussed further below, the height $H_b$ (or a vertical component of the data including the location) of hitch ball 34 can be used in connection with the determined height $H_c$ of coupler 14 to determine a desired endpoint 35 of vehicle path 32 for proper alignment between hitch ball 34 and coupler 14 when coupler 14 is lowered into a position level with (and, accordingly, engaged with) hitch ball 34.

The image processing routine 64 can be specifically programmed or otherwise configured to locate coupler 14 within image data 55. In one example, the image processing routine 64 can attempt to identify the coupler 14 within the image data 55 based on stored or otherwise known visual characteristics of coupler 14 or hitches in general. In another embodiment, a marker in the form of a sticker or the like may be affixed with trailer 16 in a specified position relative to coupler 14 in a manner similar to that which is described in commonly-assigned U.S. Pat. No. 9,102,271, the entire disclosure of which is incorporated by reference herein. In such an embodiment, image processing routine 64 may be programmed with identifying characteristics of the marker for location in image data 55, as well as the positioning of coupler 14 relative to such a marker so that the location 28 of coupler 14 can be determined based on the marker location. Additionally or alternatively, controller 26 may seek confirmation of the determined coupler 14, via a prompt on touchscreen 42. If the coupler 14 determination is not confirmed, further image processing may be provided, or user-adjustment of the position 28 of coupler 14 may be facilitated, either using touchscreen 42 or another input to allow the user to move the depicted position 28 of coupler 14 on touchscreen 42, which controller 26 uses to adjust the determination of position 28 of coupler 14 with respect to vehicle 12 based on the above-described use of image data 55. Alternatively, the user can visually determine the position 28 of coupler 14 within an image presented on HMI 40 and can provide a touch input coupler 14 in a manner similar to that which is described in co-pending, commonly-assigned U.S. patent application Ser. No. 15/583,014, the entire disclosure of which is incorporated by reference herein. The image processing routine 64 can then correlate the location of the touch input with the coordinate system 82 applied to image 30.

As shown in FIG. 3, the image processing routine 64 and operating routine 68 may be used in conjunction with each other to determine the path 32 along which hitch assist system 10 can guide vehicle 12 to align hitch ball 34 and coupler 14 of trailer 16. Upon initiation of hitch assist system 10, such as by user input on touchscreen 42, for example, image processing routine 64 can identify coupler 14 within the image data 55 and at least attempt to estimate the position 28 of coupler 14 relative to hitch ball 34 using the image data 55 in accordance with one of the examples discussed above (or a combination of the two examples) or by other known means, including by receiving focal length information within image data 55 to determine a distance $D_c$ to coupler 14 and an angle $\alpha_c$ of offset between coupler 14 and the longitudinal axis of vehicle 12. Image processing routine 64 can also be configured to identify the trailer 16 overall and can use the image data of trailer 16, alone or in combination with the image data of coupler 14, to determine the orientation or heading 33 of trailer 16. In this manner the path 32 can further be derived to align vehicle 12 with respect to trailer 16 with the longitudinal axis 13 of vehicle 12 within a predetermined angular range of the heading 33 of trailer 12. Notably, such alignment may not require that the longitudinal axis 13 of vehicle 12 is parallel or collinear with the heading 33 of trailer 16, but may simply be within a range that generally allows connection of hitch ball 34 with coupler 14 without collision between vehicle 12 and trailer 16 and may, further allow immediate controlled backing of trailer 16 using vehicle 12. In this manner, the angular range may be such that the alignment of vehicle 12 with trailer 16 at the end of the operating routine 68 is such that the angle between longitudinal axis 13 and heading 33 is less than the jackknife angle between the vehicle 12 and trailer 16 when coupled or a reasonable estimate thereof. In one example, the angular range may be such that longitudinal axis 13 is within about 30° from collinear with heading 33 in either direction. In various examples, such as when the length L of trailer 16 is known, the angular range may be greater, when permitted, or may be less, depending on the desired tolerance of system 10.

As discussed further below, certain aspects of system 10, including of imaging system 18 and/or proximity sensor array 54 can limit the ability of system 10 to determine the coupler 14 location 28 in all settings or conditions, with additional aspects of system 10 being useable to guide a user to a setting in which the ability of system 10 to determine coupler 14 location 28 is maximized or to utilize alternative means to determine coupler 14 location 28. When collected, the position information can then be used in light of the position 28 of coupler 14 within the field of view of the image data 55 to determine or estimate the height $H_c$ of coupler 14. Once the positioning $D_c$, $\alpha_c$ of coupler 14 has been determined and, optionally, confirmed by the user, controller 26 can take control of at least the vehicle steering system 20 to control the movement of vehicle 12 along the desired path 32 to align the vehicle hitch ball 34 with coupler 14.

Continuing with reference to FIG. 3 with additional reference to FIG. 2, controller 26, having estimated the positioning $D_c$, $\alpha_c$ of coupler 14, as discussed above, can, in one example, execute path derivation routine 66 to determine vehicle path 32 to align the vehicle hitch ball 34 with coupler 14. In particular, controller 26 can have stored in memory 62 various characteristics of vehicle 12, including the wheelbase W, the distance from the rear axle to the hitch ball 34, which is referred to herein as the drawbar length L, as well as the maximum angle to which the steered wheels 76 can be turned $\delta_{max}$. As shown, the wheelbase W and the current steering angle δ can be used to determine a corresponding turning radius p for vehicle 12 according to the equation:

$$\rho = \frac{1}{W\tan\delta}, \quad (1)$$

in which the wheelbase W is fixed and the steering angle δ can be controlled by controller 26 by communication with steering system 20, as discussed above. In this manner, when the maximum steering angle $\delta_{max}$ is known, the smallest possible value for the turning radius $\rho_{min}$ is determined as:

$$\rho_{min} = \frac{1}{W\tan\delta_{max}}. \quad (2)$$

Path derivation routine 66 can be programmed to derive vehicle path 32 to align a known location of the vehicle hitch ball 34 with the estimated position 28 of coupler 14 that takes into account the determined minimum turning radius $\rho_{min}$ to allow path 32 to use the minimum amount of space and maneuvers. In this manner, path derivation routine 66 can use the position of vehicle 12, which can be based on the center 36 of vehicle 12, a location along the rear axle, the location of the dead reckoning device 24, or another known location on the coordinate system 82, to determine both a lateral distance to the coupler 14 and a forward or rearward distance to coupler 14 and derive a path 32 that achieves the needed lateral and forward-backward movement of vehicle 12 within the limitations of steering system 20. The derivation of path 32 further takes into account the positioning of hitch ball 34, based on length L, relative to the tracked location of vehicle 12 (which may correspond with the center 36 of mass of vehicle 12, the location of a GPS receiver, or another specified, known area) to determine the needed positioning of vehicle 12 to align hitch ball 34 with coupler 14.

Figure 4:
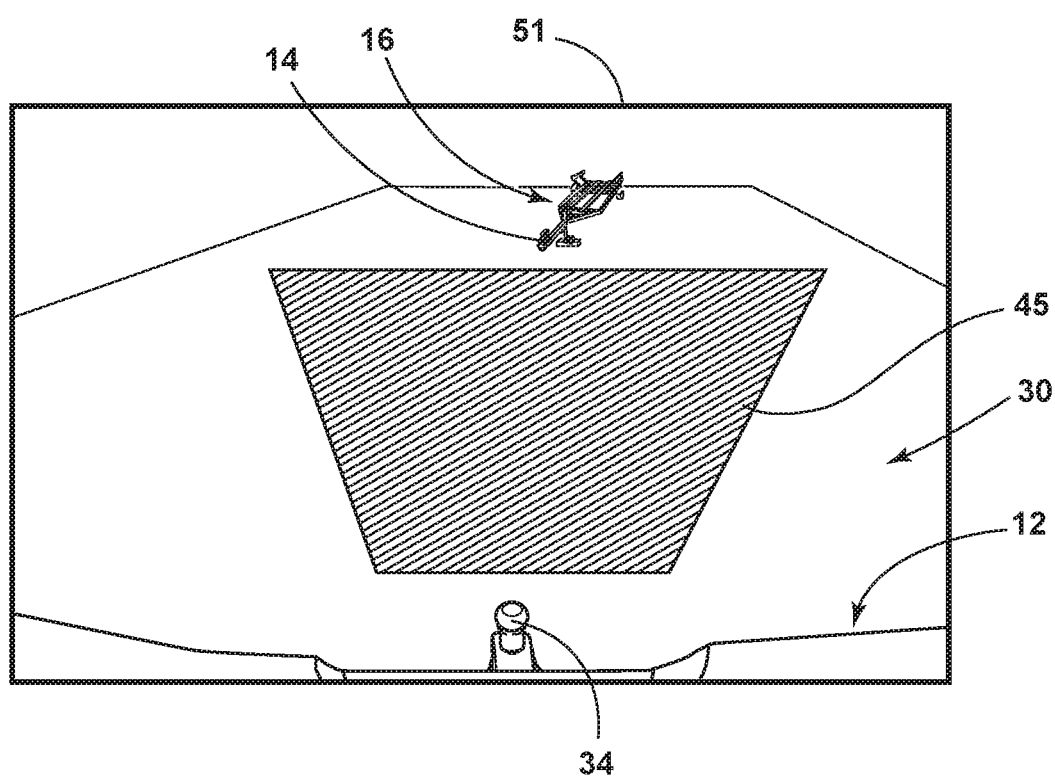
FIG. 4 is a depiction of an image received from a vehicle camera including an overlay of an target zone for visually acquiring positioning data for a trailer.

In this manner, determination of the position 28 of coupler 14, within an accepted level of accuracy, is needed for execution of the path derivation routine 66 and subsequent automated backing of vehicle 12 threrealong. Various characteristics or limitations of system 10 may impact the ability of system 10 to identify coupler 14 in the data received from imaging system 18 under certain conditions or in certain settings, which can impact the ability of controller 26 to determine the location 28 of coupler 14 using image processing routine 64. In this manner, system 10 can be generally configured to direct the user to position vehicle 12 relative to trailer 16 to increase the ability of controller 26 to identify coupler 14 in the image data 55, given the characteristics of vehicle 12 and system 10. As shown in FIG. 4, this direction may be given by way of presenting a "target zone" 45 as a graphical overlay on a real-time video image 53 of the image data 55 from one or more of the cameras 48,50,52a,52b in imaging system 18 presented on screen 44. The target zone 45 may be derived and/or presented on screen 44 according to various characteristics of system 10 and vehicle 12, including the resolution of cameras 48,50,52a,52b and the corresponding accuracy of image processing routine 64, as well as the max steering angle max of the steered wheels 76 of vehicle 12, among other possible characteristics, and may balance these characteristics and system requirements with the desire to provide widely useable functionality of system 10, overall. In this manner, the target zone 45 may require placement of the coupler 14 and/or trailer 16 within a certain distance from vehicle 12, including within a maximum and minimum distance from vehicle 12, as well as within a predetermined maximum lateral offset from vehicle 12. When initiated, system 10 can automatically attempt to identify a coupler 14 within the target zone 45 or immediately prompt the driver to position vehicle 12 such that the coupler and/or trailer 16 is within the target zone 45, while instructing the driver to confirm (by pressing a button, for example) when such positioning has been achieved, including when the initial position of vehicle 12 and trailer 16 fulfils this requirement. If system 10 looks for a coupler 14 within the target zone 45, but cannot find one, such a prompt can subsequently be given, with system 10 attempting to identify coupler 14, when confirmation is given.

If the driver can visually determine that the appropriate positioning has been achieved, or if the driver has indicated that appropriate positioning has been achieved, but system 10 can still not locate coupler, the above-mentioned use of an external portable electronic device can be used as an alternative means to determine the positioning and/or orientation of trailer 16. In one example, the portable electronic device can be a smartphone 96 or the like. In many instances, smartphones include an array of internal devices and components, including those for determining the location of the smartphone 96, as well as for determining the positioning or movement of the phone itself. In various examples, these devices include GPS devices and/or circuitry (which can include dedicated GPS components that communicate with a network of positioning satellites and/or GPS augmentation or replication circuitry or programming that can determine the location of smartphone 96 using signal strength from known sources, including cellular and data network signals, WiFi signals, or the like), as well as accelerometers, gyroscopes, or combinations thereof. In this manner, by positioning a smartphone 96 at a predetermined location or area, or on a predetermined feature of trailer 16, the smartphone 96 data regarding the location and positioning thereof can be used as or to derive the location and positioning of coupler 14 and/or trailer 16. Various other devices can be used or provided to obtain such information, including various dedicated GPS devices or the like, or a dedicated device that can be manufactured and designed specifically for use with system 10 and, for example, sold or provided with vehicles 14 having the capability described herein. It is noted, that, as used herein, the term "external" does not necessarily mean that the external portable electronic device is outside the vehicle at all times, including when the positioning and orientation data is acquired by system 10. Rather, external means that the portable electronic device is not an installed vehicle component (i.e. not mounted in vehicle). As mentioned, the portable electronic device may be provided with vehicle as "accessory". In another example, the portable electronic device may be user's own device, including a smartphone 96, GPS device or the like, which may likely be within the interior of vehicle 12 while the driver is in vehicle 12, and may further be coupled by wire (i.e. a charging or communications cable) with vehicle 12 at various instances, but can, nevertheless, be removed from vehicle 12 and will be external when measurements are taken, as described herein.

Figure 5:
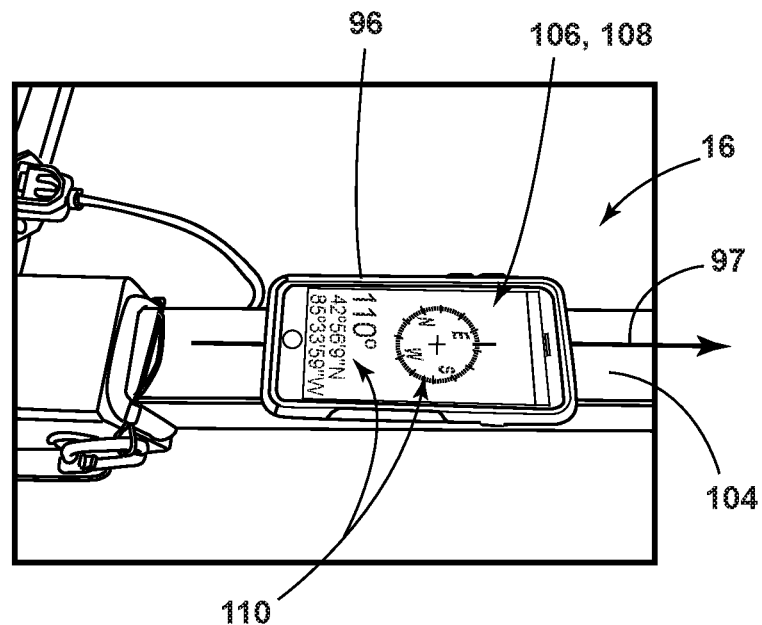
FIG. 5 is a perspective view of a smartphone used in connection with a trailer for acquiring data related to the position and orientation of the trailer.

As shown in FIG. 5, the position and orientation of coupler 14 can be measured using a smartphone 96 or other portable electronic device having the above-described characteristics or components by placing the smartphone 96 on the tongue 104 of trailer 16 in a predetermined location and with a predetermined orientation of smartphone 96 with respect to tongue 104. In many instances, smartphones 96 with the capability to determine its own orientation do so within a reference frame that is aligned with their intended positioning when being held by a user. Accordingly, most smartphones, 96 have an elongate shape defining an axis 97 thereof that is established as a line of heading for smartphone 96, as the phone is most-often held in the upright or extended direction. Further, smartphones 96 often include gyroscopes or accelerometers that can be used to detect movement of smartphone 96 and can also determine the instantaneous or static orientation of smartphone 96 along axis 97, as well as a second axis generally perpendicular thereto. Such orientation is typically presented as an angle of such axes with respect to the horizontal in each direction and, as such has a 0°, 0° value when the smartphone 96 is lying flat on a horizontal surface. In a similar manner, a determination by smartphone 96 of its position data can also include or produce the above-mentioned data regarding the heading 33 of smartphone 96. In various aspects, this data can be obtained from the above-described GPS circuitry or module within smartphone 96 or from additional circuitry or a dedicated module for implementing a compass feature of smartphone 96, which may include a magnetic electronic compass or the like. Again, the heading of smartphone 96 will generally be in a reference frame along axis 97, such that the heading data is an angle relative to the North direction (i.e. 0°) of axis 97. In this manner, the orientation data discussed above, in various aspects, can include one or more of heading data and angular orientation of trailer 16 in one or more axes. The positioning data can be independent of the orientation of smartphone 96 and, in one example, can be GPS coordinates according to known formats or the like.

Figure 6:
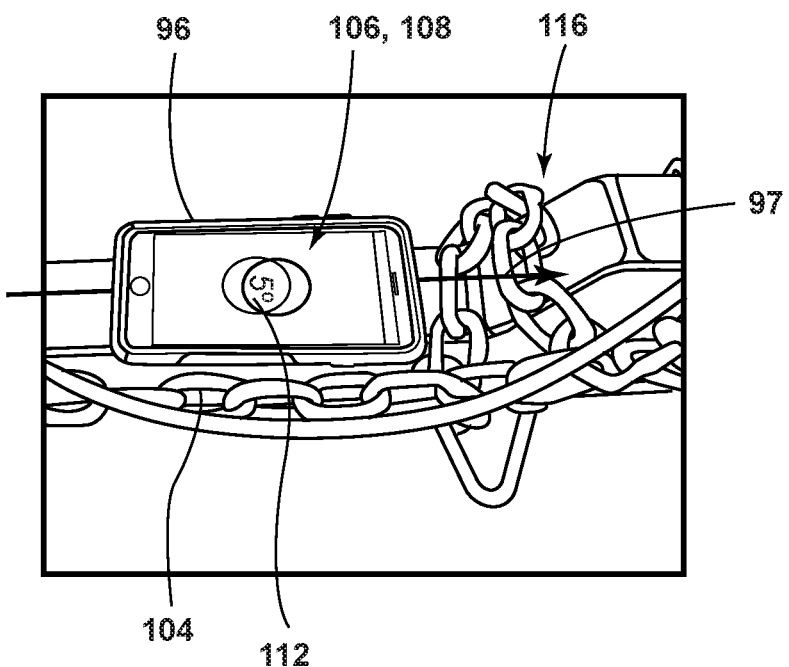
FIG. 6 is a perspective view of the smartphone used in connection with the trailer for acquiring further data related to the orientation of the trailer.
Figure 7:
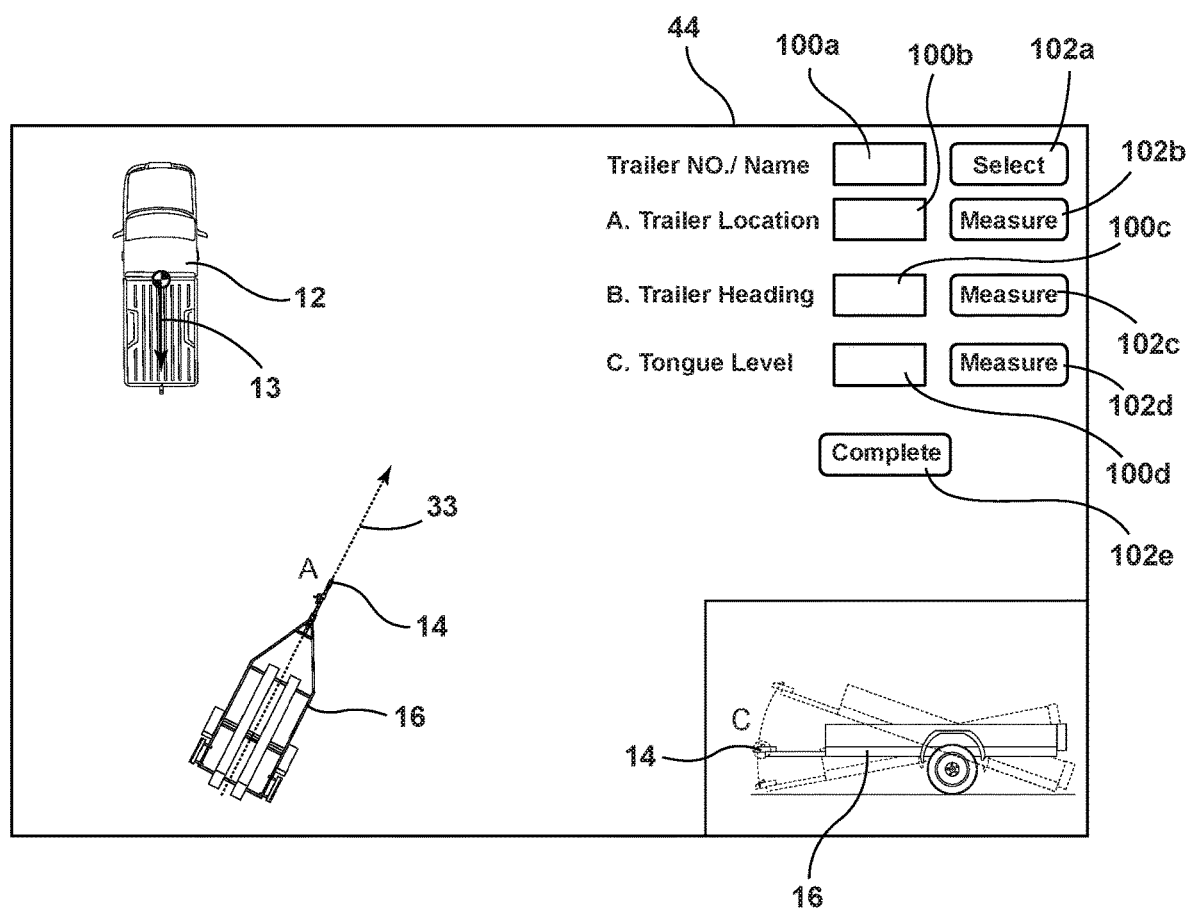
FIG. 7 is a depiction of an interface implemented by at least one of a vehicle human machine interface or a smartphone in guiding a user through a trailer position and orientation data acquisition process.

Continuing with respect to FIG. 5, smartphone 96 can be used to determine the directional orientation of trailer 16 by positioning smartphone 96 on the tongue 104 of trailer 16 such that the long axis 97 of smartphone 96 extends generally parallel with tongue 104 (which is an elongate element with a readily-discernable direction) or with an edge of smartphone 96 extending along one of the upper edges of tongue 104. In this manner, the directional orientation information 110, which may be communicated or displayed on the smartphone 96 itself by way of the interface 106, can correspond with the heading 33 of trailer 16. As shown in FIG. 6, the angular orientation data can be obtained with smartphone 96 similarly placed on tongue 104 of trailer 16. As shown, smartphone 96 can be positioned to lie flat on tongue 104 such that any angle of smartphone 96 with respect to the horizontal can be attributed to trailer 16, allowing the angle information 112, which can also be presented on interface 106, to be used as the angular orientation data for trailer 16. In one aspect, system 10 may only utilize the data relating to the angle of smartphone 96 along axis 97, which can be used as the angle 87 of trailer tongue 104 about the axle 84 thereof in determining the endpoint 35 of path 32, as discussed below with respect to FIGS. 8-10.

The positioning data for coupler 14 can be obtained in a similar manner, with smartphone 96 being similarly placed in a predetermined location along trailer 16. In one example, the position data can be obtained simultaneously with the heading 33 and angle 87 data, including at a predetermined location with respect to coupler 14. As can be appreciated, the coupler 14 of trailer 16 may generally lack a planar surface of adequate size to locate and position smartphone 96 such that the heading and angular position thereof adequately reflect the heading 33 and angle 87 of trailer 16, making positioning of smartphone 96 along tongue 104 preferred for such measurements, but requiring displacement of smartphone 96 from coupler 14. Accordingly, to obtain positioning and orientation data simultaneously, smartphone 96 can be placed at a predetermined known offset from coupler 14, such as one foot or the like, which can be approximated by user and given a reasonable tolerance within system 10 (which can update the position data as coupler 14 becomes clear within the image data 55, for example). In another example, when trailer 12 includes a target or other applied feature useable in determining a hitch angle during an automated trailer backing operation, as mentioned above, the user can position smartphone 96 directly on the target, with the distance from the target to the coupler 14 being known by system 10 for such trailer backing purposes. Alternatively, the user can position smartphone 96 directly on coupler 14 when the position data is being gathered or obtained.

In the arrangement described above, the smartphone 96 may be wirelessly connected with one or more of the above-described components of system 10 such that smartphone 96, at least when in a range of such component to achieve a wireless connection therebetween, may be considered a component of system 10. As shown in FIG. 2, in one example, smartphone 96 may wirelessly connect with the vehicle HMI 40, either directly or with an overall vehicle system that controls the HMI 40 (e.g., an on-board computer or communication system). By way of HMI 40 being connected with controller 26, the orientation and position data gathered by smartphone 96 can be passed from HMI 40 to controller 26. Various interfaces or operations of system 10 can be used to facilitate the collecting the positioning or orientation data for trailer 16 using smartphone 96 or another similarly capable portable electronic device. In one example, shown in FIG. 7, HMI 40 may present on screen 44 an interface 114 for obtaining the positioning and orientation data. In the example, an illustration of vehicle 12 may be shown in connection with a trailer image 16 (which may be a static example image or a recreation based on an adequate estimate of the position of trailer 16 achieved by image processing routine 64 that may be acceptable for such purposes, while not being sufficient for use in path derivation or operating routines 66,68) with illustrations of the positioning of smartphone 96 on trailer 16 for the collection of the positioning and orientation data.

The interface 114 may further include fields 100a-100d to display the collected information. In particular a first field 100a may include a position for entry of a trailer identifier, which may be a particular name or number that the user can provide. As system 10 can store such identifiers in memory 62, the interface 114 may further include a button 102a (which may be a virtual button) for the user to access a list of previously-stored trailer identifiers that the user may select from for the association of the data to-be collected. Providing such an identification may allow the user to store data form multiple trailers when parking such trailers 16 and decoupling them from vehicle 12, thereby allowing the user to recall such information for a particular trailer among multiple trailers 16 parked in the same vicinity for later coupling without system 10 having to attempt to identify a particular trailer 16. This function would further allow path derivation routine 66 to determine a path to align hitch ball 38 with coupler 14 immediately upon activation of system 10, if possible given other system 10 criteria. Such identification selection also allows for system 10 to access any other stored trailer characteristics, including trailer length L, which may be useable in connection with additional functionality discussed below, should such information be stored in memory 62.

Additionally, interface 114 may include additional fields 100b,100c,100d for the input or display of the trailer 16 position and orientation, including trailer heading 33 and "tongue level" (which is analogous to the angle of tongue 104, for example and can correspond with the angular orientation information obtained along axis 97 of smartphone 96, as discussed above). In this manner, system 10 may be set up to measure for each datum separately, with corresponding buttons 102b,102c,102d to initiate measurement of each characteristic, which can be done sequentially, as listed, or in an order desired by the user. Alternatively, system 10 may be configured to measure for all characteristics simultaneously (or in an automated sequence) and may include only a single such button. In a further example, smartphone 96 can include an application or other programming to facilitate data gathering, which may present a variation of interface 106 similar to the HMI interface 114, including the variations discussed herein. The smartphone 96 application may obtain access to the above-described measurement components through an application programming interface ("API") or the like so that smartphone 96 can use the application and interface 106 to automate the data collection and provide the user U relevant instructions for doing so. Further, the application can access the wireless communication device(s) of smartphone 96 to communicate the collected data to controller 26, including through HMI 40, as discussed above. In various aspects, such wireless communication may operate through a Bluetooth® connection with vehicle 12 and/or a WiFi connection with vehicle 12, depending on the capability and installed components of vehicle 12.

In a further example, HMI 40 alone can guide the user U through data collection using only the pre-installed features or functionality of smartphone 96, including installed compass, GPS, and level functionality that uses the integrated GPS, compass, gyroscope, and/or accelerometer devices. In this example, the interface 114 of FIG. 7 may be presented on HMI 40 and the user U activates the pre-installed applications associated with the particular fields 100b,100c, 100d to obtain the datum values individually before entering them into the fields using an input device associated with HMI 40 or a numeric keypad presented on HMI 40 and operable by way of touchscreen 42. In this manner, system 10 may acquire the position and orientation data from the smartphone 96 or other portable electronic device by way of the user input. In the alternative arrangement, discussed above, wherein an application is also installed on smartphone 96, the user U may press a single button and then be prompted by HMI 40 to place smartphone 96 in the relevant area of trailer 16 (e.g., on tongue 104). System 10 can then wait for a "ready" indication from user U by way of input on smartphone 96 using a similar button or by a signal from the accelerometer of smartphone 96 consistent with smartphone being placed on a surface (e.g., tongue 104), at which point the application can access the relevant devices on smartphone 96 to gather the position and orientation data. System and/or smartphone 96 can then populate the fields 100b, 100c,100d for which data was successfully obtained with the user U initiating specific data collection routines for any characteristics for which the initial round was unable to obtain a measurement. If no measurement is obtained in this manner, the information may be gathered manually, as discussed above before being entered into the relevant field 100b,100c,100d by way of HMI 40 or smartphone 96. When the process is complete, an additional button 102e can be pressed to end the process and/or to initially confirm that the information has been gathered. In a subsequent confirmation operation, system 10 may display an indication on HMI 40 including image data 55, as shown in FIG. 4, corresponding with the position and orientation data acquired from smartphone 96 for the user to visually confirm that the data does correspond with the general position and orientation of a trailer 16 visible on screen 44. After such initial and/or final confirmation, the user U can be presented an option to initiate the operating routine 68, as disused further below.

In addition or as an alternative to the above-described wireless connection between smartphone and vehicle 12 (by way of HMI 40 or otherwise) smartphone 96 may be connected with vehicle 12 by a wired connection, including to HMI 40 or the controlling on-board computer or communication/entertainment system associated therewith. Such a wired connection can include a universal serial bus ("USB") connection by way of a cable that connects between smartphone 96 and vehicle 12, which can provide power for smartphone 96 and a data connection between smartphone 96 and the associated circuitry/components. In this manner, smartphone 96 may be used out of the range of the wireless devices associated with vehicle 12, or without first connecting with such systems or devices, or when such devices are inactive (e.g., when vehicle 12 is not running and its powered components are turned off) with the above-described optional application collecting the position and orientation data and storing it in the memory within smartphone 96 can be removed from vehicle and will be external when measurements are taken. Subsequently, smartphone 96 can be connected to vehicle 12 via the wired connection and the data can be transferred and stored in memory 62. It is further noted that such a scheme can be employed when a wireless connection cannot be established, with the data being wirelessly transferred upon establishment of a wireless connection between smartphone 96 and vehicle 12.

In the above-described variation of system 10, the position and orientation data are obtained from smartphone 96 in a format or construction that is absolute, placing the trailer 16 location (including the coupler 14 location 28) and heading 33 on a earth-based coordinate system. In this manner, vehicle 12 may also use its own system and functionality, including positioning system 22, which may include a compass and GPS in addition to dead reckoning device 24. In this manner, path derivation routine 66 may compare the position and orientation of vehicle, by which the hitch ball 38 position can be determined, with that of trailer 16 in order to derive the backing path 32 to align hitch ball 38 with coupler 14. In an alternative arrangement, the position and orientation for trailer 16 may be obtained relative to the vehicle 12. In one such example, application 108 can use accelerometer and/or gyroscope data to determine movement of smartphone 96 during the data gathering process. Such movement can include an initial tap in a predetermined position (i.e. with axis 97 perpendicular with the bumper of vehicle 12) on hitch ball 38, followed by a subsequent tap on tongue 104. Between such taps, the application 108 can use the accelerometer and gyroscope data to determine the direction and velocity of the movement of smartphone 96 between the hitch ball 38 and the trailer 16 tongue 104, with the clock of smartphone 96 further being used to turn the velocity and direction information into displacement. Other processes, including combinations of the above-described processes are also possible.

Figure 8:
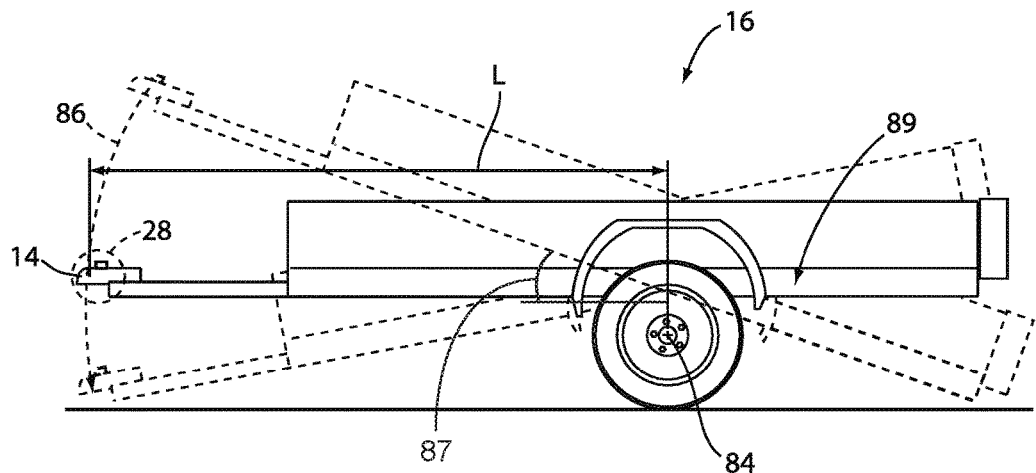
FIG. 8 is a side schematic view showing the trajectory of a trailer coupler during pivoting of the trailer about a point.
Figure 9:
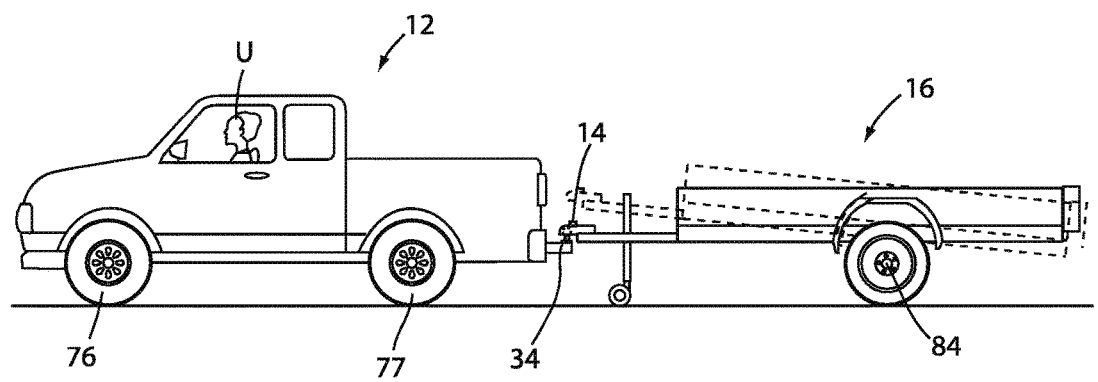
FIG. 9 is a side view showing a vehicle in a hitching operation with a trailer requiring downward movement of the trailer coupler.
Figure 10:
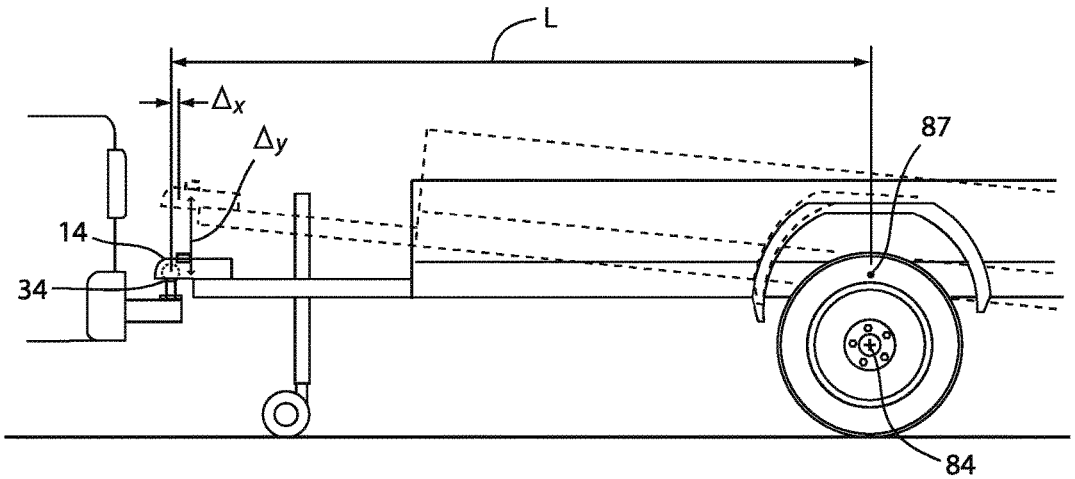
FIG. 10 is a detail view showing the horizontal offset in coupler position resulting from downward movement of the coupler to hitch with a vehicle.

As discussed above, path derivation routine 66 can determine the endpoint 35 of path 32 to achieve alignment between hitch ball 34 and coupler 14 with the alignment between vehicle axis 13 and the trailer heading 33 within a predetermined angular range, as discussed above. In this manner, as shown in FIGS. 8-10, the position 28 of coupler 14 in what is referred to herein as a "driving direction", which is a direction generally parallel with the ground surface on which vehicle 12 is positioned (i.e. perpendicular to the vertical direction), the ground surface itself generally defining a driving plane (which is not itself necessarily planar). In particular, in the single-axle trailer 16 shown in FIGS. 8-10, the coupler 14 may move in a horizontal direction toward and away from the axle 84 as coupler 14 rotates about the axle 84. In this manner, the horizontal and vertical movements of coupler 14 are directional components of the overall rotational movement of coupler 14 about axle 84 and along a trajectory 86, which as shown takes the form of an arced path about axle 84. Accordingly, when vehicle 12 is reversed toward trailer 16, an endpoint 35 of vehicle path 32 resulting in hitch ball 34 being aligned vertically with coupler 14, an elevated position 28 of coupler 14 would result in misalignment between coupler 14 and hitch ball 34 when coupler 14 is lowered into a horizontally-aligned position with hitch ball 34. Because such horizontal alignment is needed to receive hitch ball 34 within coupler 14 for coupling of vehicle 12 with trailer 16, such misalignment is undesirable. In this manner, hitch assist system 10 can compensate for horizontal movement Δx of coupler 14 in a driving direction away from axle 84 by determining the movement of coupler 14 in the vertical direction Δy that will be needed to receive hitch ball 34 within coupler 14.

As discussed above, hitch assist system 10 can provide image data 55 to controller 26 that can be used by image processing routine 64 (by the process described above or by other available processes) to determine the height $H_b$ of hitch ball 34 (i.e. a vertical component of the data including the position 28 of coupler 14. Further, hitch assist system 10 can have stored in memory 62 or can otherwise determine the height $H_b$ of hitch ball 34. In one example, during an initial setup routine for hitch assist system 10, a user can be prompted to install hitch ball 34 by way of assembling a ball mount including hitch ball 34 with a receiver positioned on the rear of vehicle 12. The user can then be asked to measure the height $H_b$ of the hitch ball 34 (such as to the top or center thereof) and to enter that measurement into memory 62 by way of HMI 40, for example. In this manner, a number of different height measurements for a plurality of hitch balls 34 used in connection with the particular vehicle 12 can be stored in memory 62 and can be selected by the user. In another example, hitch ball 34 may be within the field of view 49 of rear camera 48, as shown in FIG. 4, such that image data 55 can be processed to determine the height $H_b$ of hitch ball 34 on a real-time or on-demand basis.

As shown in FIG. 9, a strategy for determining an endpoint 35 for vehicle path 32 that places hitch ball 34 in a desired position $38_d$ for alignment with coupler 14 given the vertical component of the position 28 of coupler 14 involves calculating the actual or an approximate trajectory 86 for movement of coupler 14 about axle 84. Endpoint 35 is then derived, as discussed above or otherwise, to place hitch ball 34 at the desired location $38_d$ on that trajectory 86. In effect, such a scheme is implemented by determining the difference between the height of coupler 14 and the height $H_b$ of hitch ball 34, which represents the vertical distance Δy by which coupler 14 will be lowered to engage with hitch ball 34. The determined trajectory 86 is then used to relate the vertical distance Δy with a corresponding horizontal distance Δx of coupler 14 movement in the driving direction that results from the vertical distance Δy. This horizontal distance Δx can be input directly into path derivation routine 66 as a desired endpoint 35 thereof or can be applied as an offset to an endpoint 35 derived from the initially determined position 28 of coupler 14 when path 32 ends with a straight-backing segment, as illustrated in FIG. 3.

Continuing with reference to FIG. 9, a generally accurate estimation for trajectory 86 can be made in a simplified manner by assuming that coupler 14 pivots about a point that is at the same height as the height $H_b$ of hitch ball 34. In this manner, the height of axle 84 does not need to be known. In this manner, the trajectory 86 can be determined as an arc with a radius corresponding to the drawbar length L of the trailer 16, which is the horizontal distance between coupler 14 and pivot point 87, such an arc being centered about pivot point 87. Accordingly, hitch assist system 10 must utilize some value for the drawbar length L. In one implementation, the drawbar length L can be a constant value stored in memory 62 that generally corresponds with an average of a determined typical trailer length for use with the particular type of vehicle 12, which may give an acceptable calculation of trajectory 86. In another implementation, a set of different drawbar lengths L can be stored in memory 62 and can correspond with different average lengths for various trailer types (e.g., boat, utility, recreational vehicle, or the like) that can be selected by the user or determined by image processing routine 64. Still further, various related vehicle systems, including various implementations of a trailer backup assistance system can provide a simplified user interface to control a vehicle 12 during reversing of a trailer 16, such as that which is described in U.S. Pat. No. 9,821,845, the entire disclosure of which is hereby incorporated by reference herein. Hitch assist system 10 can be included in a vehicle having such an additional system or related capability such that a value obtained for drawbar length L by operation of the trailer backup assist system can be used by hitch assist system 10 in determining trajectory 86. In a particular aspect, hitch assist system 10 may include one or more of the above-described average drawbar lengths L stored in memory 62 as default settings, allowing hitch assist system 10 to operate without requiring a measurement, entered or derived, for drawbar length L, while allowing use of a specific value, when entered or available.

Given a particular value for drawbar length L, hitch assist system 10 can use the determination of the vertical component of the location 28 of coupler 14, corresponding with the height $H_c$ of coupler 14, as well as the height $H_b$ of hitch ball 34 to derive a value for the vertical movement Δy of coupler 14 used to determine the adjustment offset Δx for endpoint 35 of path 32. In a case where the trailer 16 is assumed to be a two-wheeled single axle trailer 16 (as shown in FIGS. 4-6), the trailer pivot point 87 can be assumed to be level with the hitch ball 34, when the trailer 16 is coupled with vehicle 12, the floor 89 of trailer 16 is parallel to the ground, and the coupler 14 does not raise or lower independently of the rest of trailer 16 (and is only raised by rotation about pivot point 87), the following equation can be used to determine the adjustment offset Δx:

$$\Delta x = L - \sqrt{L^2 - \Delta y^2} \qquad (3)$$

In instances when any of the above assumptions cannot be made, such as by when the geometry of the actual trailer 16 varies from the geometry relating to the assumed conditions, the endpoint 35 of path 32 derived using the determined offset Δx may not be accurate enough to align coupler 14 with hitch ball 34 when coupler 14 is lowered toward hitch ball 34. Hitch assist system 10 may be configured to allow for compensation of such variations. For example, equation (3) can be modified to allow for an input of the height of axle 84 so that trajectory 86 can be positioned about axle 84 to compensate for the pivot point 87 being horizontally unaligned with hitch ball 34. Further, any difference between hitch ball 34 and pivot point 87 can be used to determine an angle of floor 89 that is non-zero when coupler 14 and hitch ball 34 are engaged. Alternatively, a measurement of such angle can be input and used in a modified version of equation (3) and to determine the height of pivot point 87.

As can be appreciated, such a determination involves an initial determination of the height $H_c$ of coupler 14, which as discussed above is obtained using imaging system 18 in connection with image processing routine 64. As further discussed above, some settings or environmental characteristics may make the coupler height $H_c$ determination difficult (along with the coupler location 28 along the driving plane, as discussed above). In this manner, when such information is not obtained using imaging system 18 and image processing routine 64, the orientation data including the trailer angle 87 obtained using smartphone 96, as discussed above, can be used to determine the horizontal distance $\Delta_x$ of coupler 14 movement in the driving direction. In one example, when the acquired position and orientation data is associated with a particular trailer 16 (as discussed above) having a corresponding length L stored in memory 62, the angle 87 or "trailer level" can be used in connection with the length L to determine the offset $\Delta_x$, including by estimating the rotation point of trailer 16 at the hitch ball 38 height and assuming a 0° trailer angle when coupler 14 is engaged with hitch ball 38 in a similar manner to such determination when the coupler height $H_c$ is known. In the alternative, when a particular trailer length L is not known, a baseline estimate can be used, or the user can be asked whether the trailer 16 is long, medium, or short, with particular ranges of lengths being associated therewith and particular mean or medium length values being used for the offset $\Delta_x$ determination. In a further alternative, the smartphone 96 (or other portable electronic device) can also be used to determine the trailer length L by requesting that the user position smartphone 96 on trailer 16 in a position vertically aligned with axle 84 with the position data for axle 84 being compared with that of coupler 14 to determine the trailer length L, with the derived value being useable in connection with the offset determination and any additional system 10 functionality that uses trailer length L.

As discussed above, once the desired path 32, including endpoint 35, has been determined using either of the offset determination schemes discussed above, controller 26 is then allowed to at least control the steering system 20 of vehicle 12 with the powertrain control system 72 and the brake control system 70 (whether controlled by the driver or by controller 26, as discussed below) controlling the velocity (forward or rearward) of vehicle 12. In this manner, controller 26 can receive data regarding the position of vehicle 12 during movement thereof from positioning system 22 while controlling steering system 20, as needed to maintain vehicle 12 along path 32. In particular, the path 32, having been determined based on the vehicle 12 and the geometry of steering system 20, can adjust the steering angle δ, as dictated by path 32, depending on the position of vehicle 12 therealong. It is additionally noted that in an embodiment, the path 32 may comprise a progression of steering angle δ adjustment that is dependent on the tracked vehicle position.

As illustrated in FIG. 3, vehicle path 32 can be determined to achieve the needed lateral and rearward movement within the smallest area possible and/or with the lowest number of maneuvers. In the illustrated example of FIG. 3, path 32 can include two portions defined by steering of wheels 76 in different directions to collectively traverse the needed lateral movement of vehicle 12, while providing final straight, rearward backing segment to bring hitch ball 34 into the above-described offset alignment with coupler 14. It is noted that variations in the depicted path 32 may be used. It is further noted that the estimates for the positioning $D_c$, $\alpha_c$ of coupler 14 may become more accurate as vehicle 12 traverses path 32, including to position vehicle 12 in front of trailer 16 and as vehicle 12 approaches coupler 14. Accordingly, such estimates can be continuously derived and used to update path derivation routine 66, if necessary, in the determination of the adjusted endpoint 35 for path 32, as discussed above. In a similar manner, the path 32, as derived using the position and orientation data acquired from smartphone 96, can be fine-tuned once the image processing routine 64 can identify coupler 14 in the image data 55, with continued updates for path 32 being similarly derived as the image data 55 becomes increasingly clear during the approach toward trailer 16. It is further noted that, until such a determination can be made, the dead reckoning device 24 can be used to track the location of vehicle 12 in its movement along path 32 toward the initially-derived endpoint 35.

Figure 11:
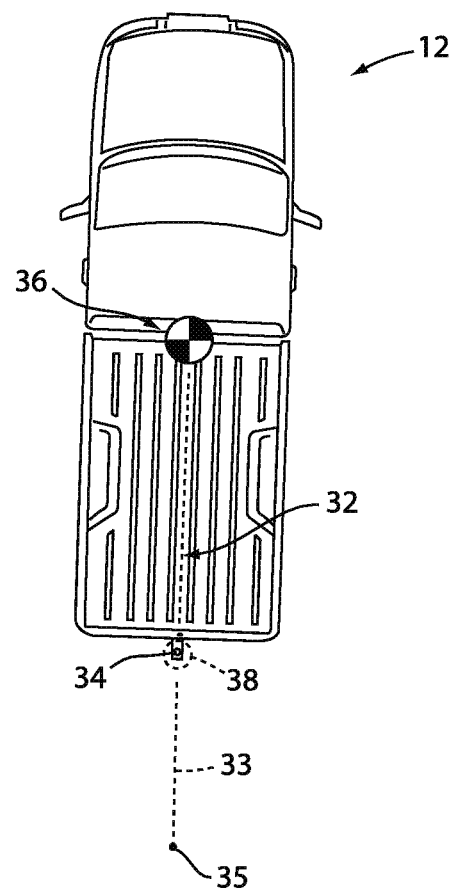
FIG. 11 is an overhead schematic view of the vehicle during a subsequent step of the alignment sequence with the trailer.
Figure 11:
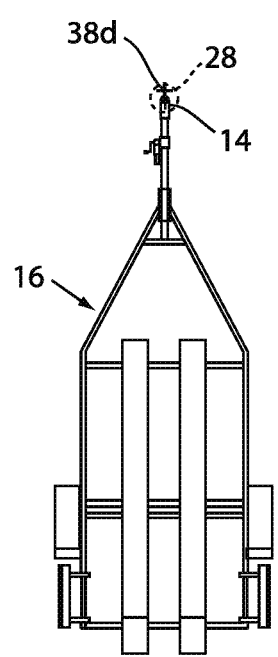
Figure 12:
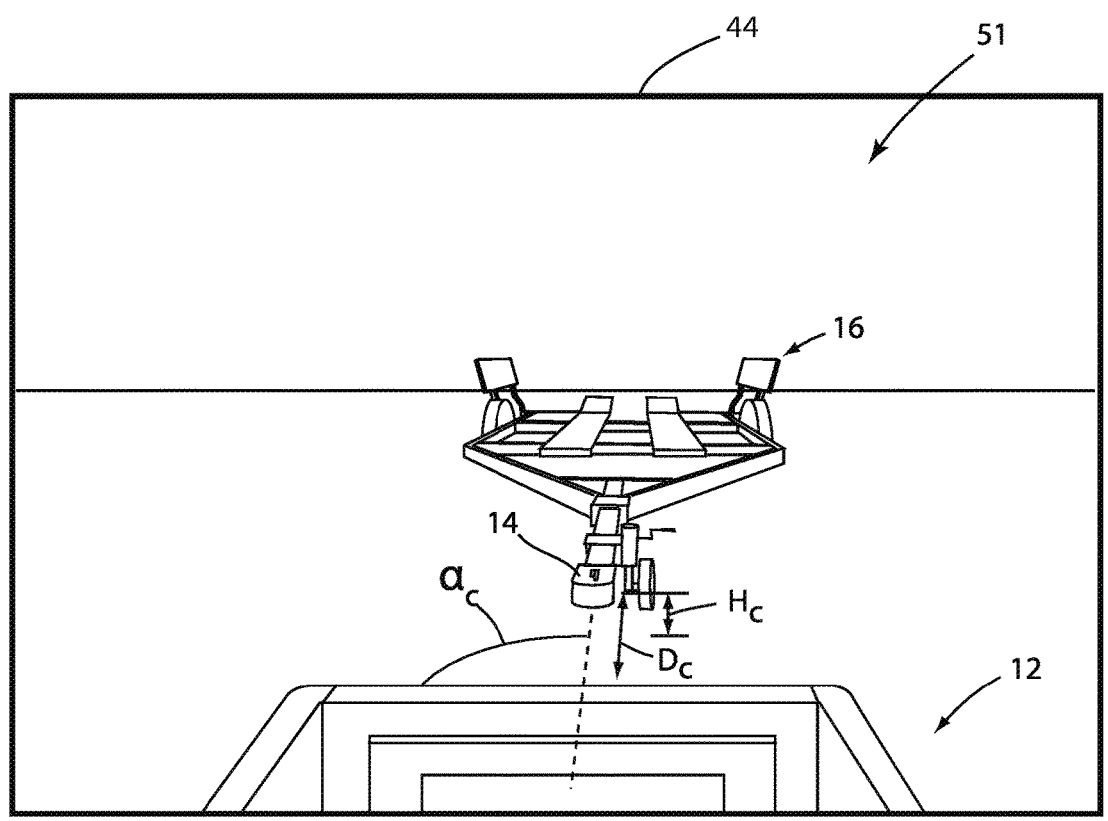
FIG. 12 is a depiction of an image received from a vehicle camera during the alignment sequence step of FIG. 11.
Figure 13:
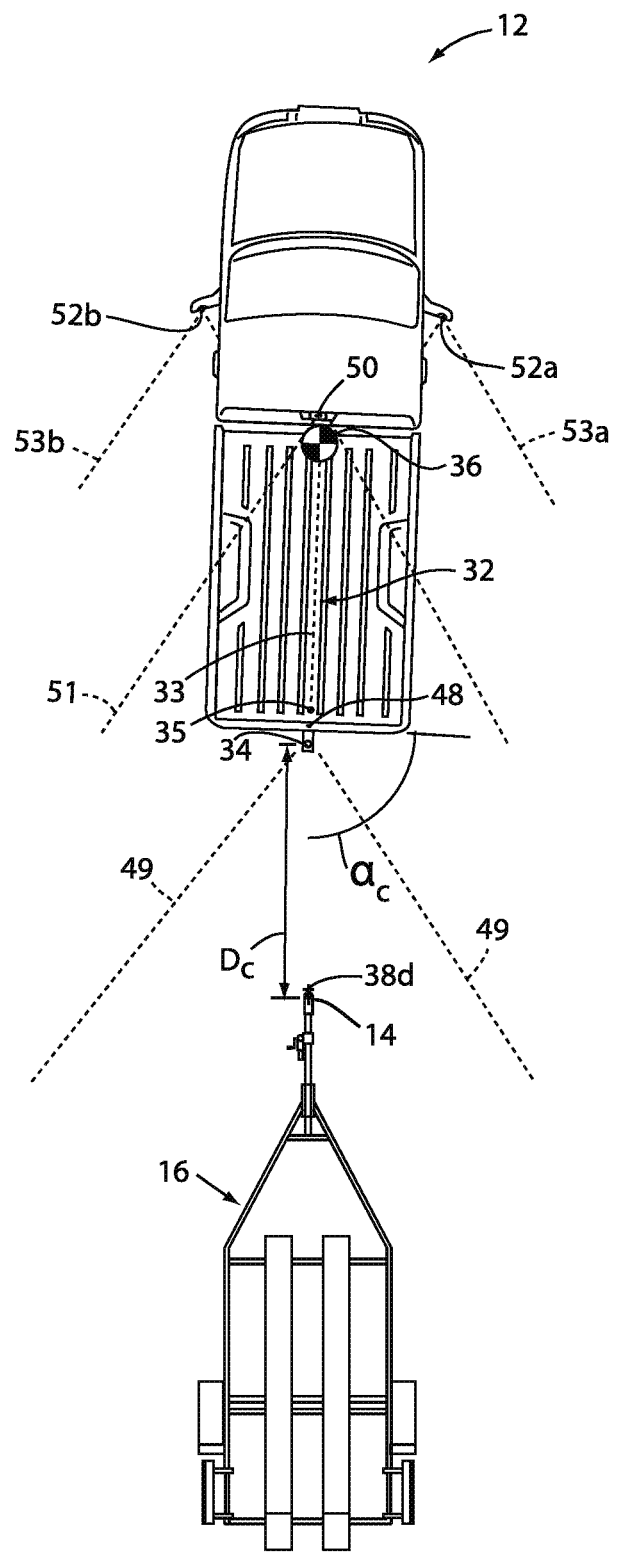
FIG. 13 is an overhead schematic view of the vehicle during a subsequent step of the alignment sequence with the trailer.
Figure 14:
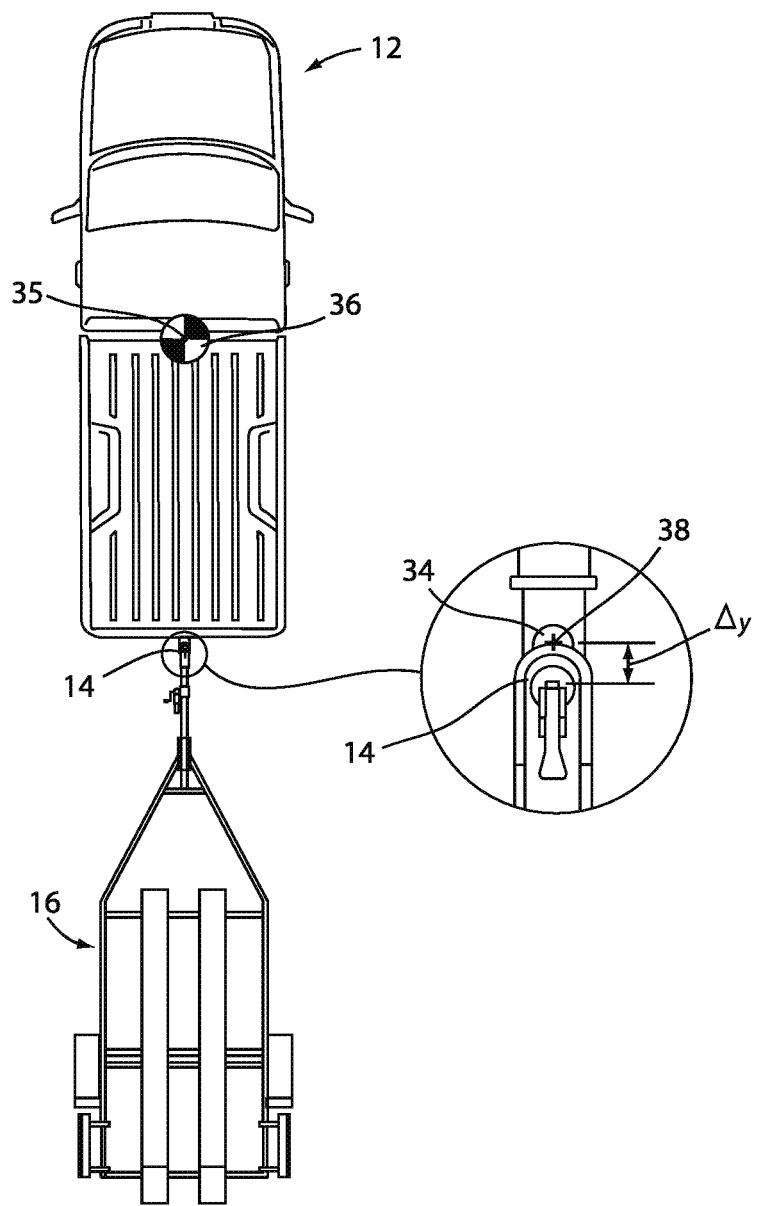
FIG. 14 is an overhead schematic view of the vehicle during a subsequent step of the alignment sequence with the trailer and showing the position of a hitch ball of the vehicle at an end of a derived alignment path.

Turning now to FIGS. 11-14, operating routine 68 may continue to guide vehicle 12 until hitch ball 34 is in the desired position $38_d$ relative to coupler 14 for coupler 14 to engage with hitch ball 34 when coupler 14 is lowered into horizontal alignment therewith. In the example discussed above, image processing routine 64 continuously monitors the positioning $D_c, \alpha_c$ of coupler 14, constantly or once available, during execution of operating routine 68, including as coupler 14 comes into clearer view of rear camera 48, as shown in FIG. 12, with continued movement of vehicle 12 along path 32, as shown in FIG. 11. As discussed above, the position of vehicle 12 can also be monitored by dead reckoning device 24 with the position 28 of coupler 14 being continuously updated and fed into path derivation routine 66 in case path 32 and or endpoint 35 can be refined or should be updated (due to, for example, improved height $H_c$, distance $D_c$, or offset angle $\alpha_c$ information due to closer resolution or additional image data 55), including as vehicle moves closer to trailer 16, as shown in FIG. 13. Still further, the coupler 14 can be assumed to be static such that the position of vehicle 12 can be tracked by continuing to track the coupler 14 to remove the need for use of the dead reckoning device 24. In a similar manner, a modified variation of operating routine 68 can progress through a predetermined sequence of maneuvers involving steering of vehicle 12 at or below a maximum steering angle $\delta_{max}$, while tracking the position $D_c$, $\alpha_c$ of coupler 14 to converge the known relative position of hitch ball 34 to the desired position 38d thereof relative to the tracked position 28 of coupler 14, as discussed above and shown in FIG. 14.

Figure 15:
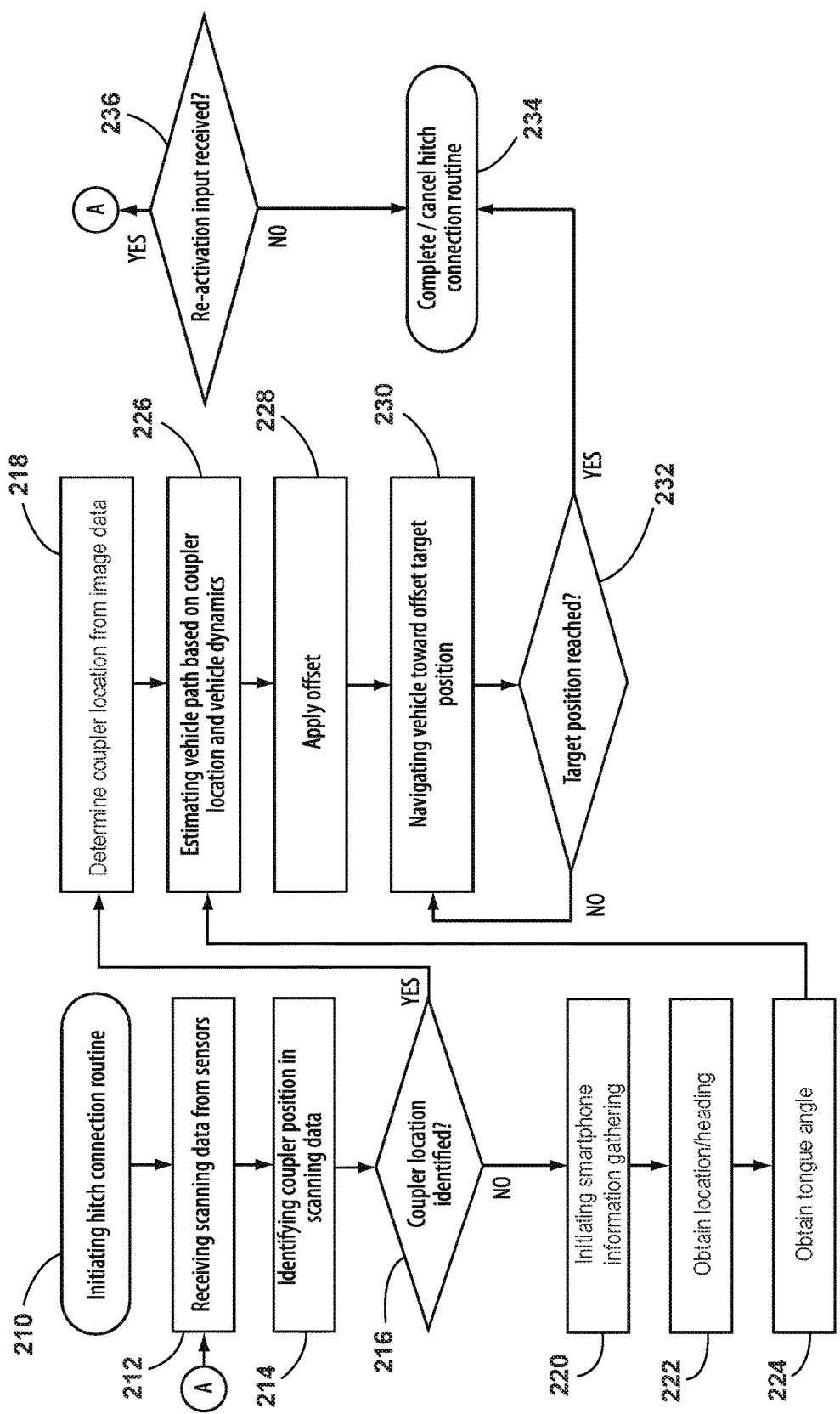
FIG. 15 is a flowchart depicting steps in the alignment sequence.

Turning now to FIG. 15, a flowchart showing steps in using hitch assist system 10 to align a vehicle hitch ball 34 with a trailer coupler 14 is shown. In particular, in step 210, the hitch assist system 10 is initiated. Once the hitch assist system 10 is initiated 210, controller 26 can use imaging system 18 to scan the viewable scene using any or all available cameras 48, 50, 52a, 52b (step 212). The scene scan (step 212) can be used to then identify coupler 14 and, optionally, the associated trailer 16, within which may be confirmed by the user. As discussed above, the vehicle 12 45 may be displayed on HMI 40 as an overlay on a display of image data 55 with the driver instructed to position the object coupler 14 within the vehicle 12 45.

If the coupler 14 can be identified in the image data 55, the height $H_c$, distance $D_c$, and offset angle $α_c$ of coupler 14, as identified in step 216, can then be determined using the available image data 55 (step 218) as discussed above, including using image processing routine 64. As discussed above, image processing routine 64 can be programmed or otherwise configured to identify coupler 14 of trailer 16 within image data 55 (step 116). In this manner, after the results of the initial scene scan (step 112) are analyzed (steps 114-118), controller 26 can determine if coupler 14 has been confirmed by the user (such as by way of HMI40)). If coupler 14 has not been confirmed or if a determined coupler 14 has been rejected, the scene scan (step 112) can be continued, including while instructing driver to move vehicle 12 to better align with trailer 16, including by positioning coupler 14 within vehicle 12 45, until coupler 14 is identified.

If no coupler 14 is identified in image data 55, including when the driver is unable or does not wish to align coupler 14 with vehicle 12 45 or when coupler 14 is within vehicle 12 45 by cannot be identified (including due to ambient lighting conditions, weather, obstructions, etc.), system 10 can initiate 220 the above-described process for acquiring the trailer 16 and/or coupler 14 position and orientation acquisition using smartphone 96 or other comparable portable electronic device. As shown in FIG. 15, and described further above, system 10 can then obtain 222,224 the positioning and heading 33 data and the tongue level data using smartphone 96 according to any of the above-described processes.

When coupler 14 has been identified and confirmed, the path derivation routine 66 can be used to determine the vehicle path 32 to align hitch ball 34 with coupler 14 in step 226. In this manner, the positioning $D_h$, $α_h$ of coupler 14 is extracted from the image data 55 or from the data acquired from smartphone 96 and used to place the coupler 14 within the stored data relating the image coordinates with the real-world coordinates of the area surrounding vehicle 12. In doing so, controller 26 uses path derivation routine 66 to determine path 32 (step 226) to align hitch ball 34 with the predicted position 28 of coupler 14 when lowered, if necessary (step 228), to an engaging position over hitch ball 34, as described above with respect to FIGS. 3-10.

Once the path 32 has been derived, hitch assist system 10 can ask the user U to relinquish control of at least the steering wheel of vehicle 12 (and, optionally, the throttle 73 and brake, in the implementation of hitch assist system 10 described above wherein controller 26 assumes control of powertrain control system 72 and brake control system 70 during execution of operating routine 68). When it has been confirmed that user U is not attempting to control steering system 20 (for example, using torque sensor 80, as discussed above), controller 26 begins to move vehicle 12 along the determined path 32. Hitch assist system 10 then controls steering system 20 (step 232) to maintain vehicle 12 along path 32 as either user U or controller 26 controls the velocity of vehicle 12 using powertrain control system 72 and braking control system 70 (step 230). As discussed above, controller 26 or the user can control at least steering system 20, while tracking the position $D_c$, $α_c$ of coupler 14 (step 232) until vehicle 12 reaches endpoint 35, wherein the vehicle 12 hitch ball 34 reaches the desired position $38_d$ for the desired alignment with coupler 14, at which point operating routine 68 can end (step 234), either by controlling brake system 70 to cause vehicle 12 to stop (which can be done progressively as vehicle 12 approaches such a point), or by issuing a command to the user to stop vehicle 12 (which can also be done progressively or by a countdown as vehicle 12 approaches the desired location) before deactivating hitch assist system 10. Vehicle 12 can then be driven normally with system 10 remains idle until a reactivation input 236 is received, at which point the above-described method restarts at the scanning step 212.

It is to be understood that variations and modifications can be made on the aforementioned structure without departing from the concepts of the present disclosure, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:
1. A vehicle hitch assistance system, comprising:
an internal vehicle controller:
acquiring data from an external portable electronic device including position and orientation data of the portable electronic device;

associating the position and orientation data of the portable electronic device with a position and orientation of a portion of a trailer spaced apart from a coupler of the trailer, and determining a location of the coupler based on the position and orientation of the portion of the trailer; and deriving a vehicle path to align a hitch ball of the vehicle with the coupler using the position and orientation of the coupler.

2. The system of claim 1, wherein:
the orientation data includes a directional heading of the portable electronic device, the directional heading of the portable electronic device being associated with a directional heading of the trailer; and
the controller derives the vehicle path to align a vehicle longitudinal axis with the directional heading of trailer within a predetermined angular range about the coupler.

3. The system of claim 1, wherein the position data includes a location of the portable electronic device, the location of the portable electronic device being associated with a location of the portion of the trailer and being used to determine the location of the coupler on a driving plane on which the vehicle is positioned.

4. The system of claim 1, further including a smartphone wirelessly connected with the controller, wherein:
the smartphone is the external portable electronic device and includes at least one internal component useable to obtain the orientation and position data.

5. The system of claim 1, further including a human-machine interface in communication with the controller, the controller causing the human-machine interface to display at least one prompt directing a user to operate the external portable electronic device for the controller to acquire the position and orientation data.

6. The system of claim 5, further including one or more internal detection devices; wherein the controller:
first attempts to determine the position and orientation of the trailer based on data acquired from the one or more internal detection devices; and
only if the controller is unable to determine the position and orientation of the trailer based on the data acquired from the one or more internal detection devices, causes the human-machine interface to display the at least one prompt and acquires the data from the external portable electronic device.

7. The system of claim 1, wherein associating the position and orientation data of the portable electronic device with the position and orientation of the portion of the trailer includes locating the position and orientation of the portion of the trailer relative to the vehicle.

8. The system of claim 1, wherein:
the position and orientation data is absolute; and
deriving the vehicle path to align the hitch ball of the vehicle with the coupler includes comparing the determined position and orientation of the trailer with known position and orientation data of the vehicle.

9. The system of claim 1, wherein the position and orientation data is obtained with the external portable electronic device being positioned on a tongue of the trailer adjacent the coupler.

10. The system of claim 1, wherein:
the position and orientation data is storable in memory accessible by the controller; and
the memory is configured to store position and orientation data entries for multiple trailers and associated couplers for selective access by the controller.

11. A vehicle, comprising:
a hitch ball mounted on an exterior of the vehicle;
a controller:
acquiring data from an external portable electronic device including position and orientation data of a trailer, including a coupler thereof; and
deriving a vehicle path to align the hitch ball of the vehicle with the coupler using the position and orientation data of at least one of the trailer and the coupler;
a human-machine interface in communication with the controller, the controller causing the human-machine interface to display at least one prompt directing a user to operate the external portable electronic device for the controller to acquire the position and orientation data; and
one or more internal detection devices; wherein the controller:
first attempts to acquire data from the one or more internal detection devices including the position and orientation data of the trailer; and
only if the controller is unable to acquire the data from the one or more internal detection devices, causes the human-machine interface to display the at least one prompt and acquires the data from the external portable electronic device.

12. The vehicle of claim 11, further comprising:
a steering system; and
a brake system;
wherein the controller further controls the steering system to guide the vehicle along the path and controls the brake system to stop the vehicle at an end of the vehicle path.

13. The vehicle of claim 11, wherein:
the orientation data includes a directional heading of the trailer; and
the controller derives the vehicle path to align a vehicle longitudinal axis with the directional heading of trailer within a predetermined angular range about the hitch ball.

14. The vehicle of claim 11, wherein the position data includes a location of the coupler on a driving plane on which the vehicle is positioned.

15. The vehicle of claim 11, further including a communication system, wherein the external portable electronic device is wirelessly connected with the communication system, the communication system being connectable with the controller for the controller to acquire the position and orientation data from the external portable electronic device through the communication system.

16. The vehicle of claim 11, wherein the controller is internal to the vehicle.

17. The vehicle of claim 11, wherein the controller acquires the data including position and orientation data of the trailer by:
acquiring initial data from an external portable electronic device that includes position and orientation data of the portable electronic device and associating the position and orientation data of the portable electronic device with the position and orientation of a portion of a trailer spaced apart from a coupler of the trailer; and
determining the location of the coupler based on the position and orientation of the portion of the trailer.

18. A method for assisting a vehicle in hitching with a trailer, comprising:

attempting to identify a position and an orientation of the trailer in data received from one or more internal detection devices within the vehicle;

only if the position and orientation of the trailer cannot be identified in the data received from the one or more internal detection devices, only if the data cannot be acquired from the one or more internal detection devices, prompting a user to operate an external portable electronic device to acquire the position and orientation data of the trailer data from external portable electronic device, including of a coupler thereof; and deriving a vehicle path to align the hitch ball of the vehicle with the coupler using the position and orientation data of at least one of the trailer and the coupler.

19. The method of claim 18, wherein:

the orientation data includes a directional heading of the trailer; and the vehicle path further aligns a vehicle longitudinal axis with the directional heading of trailer within a predetermined angular range about the hitch ball.

20. The method of claim 18, wherein the step of deriving the vehicle path is carried out from within the vehicle.

* * * * *

UNITED STATES PATENT AND TRADEMARK OFFICE
CERTIFICATE OF CORRECTION

PATENT NO. : 11,090,990 B2  
APPLICATION NO. : 16/133115  
DATED : August 17, 2021  
INVENTOR(S) : Ling Page 1 of 1

It is certified that error appears in the above-identified patent and that said Letters Patent is hereby corrected as shown below:

In the Claims

Column 23:  
Claim 18, Lines 7-8;  
Delete "only if the data cannot be acquired from the one or more internal detection devices,"  
Claim 18, Line 10;  
After "from" insert --the--.

Signed and Sealed this  
Ninth Day of November, 2021

Drew Hirshfeld  
*Performing the Functions and Duties of the*  
*Under Secretary of Commerce for Intellectual Property and*  
*Director of the United States Patent and Trademark Office*